(12) United States Patent
Taoka

(10) Patent No.: US 10,861,131 B2
(45) Date of Patent: Dec. 8, 2020

(54) IMAGE MAGNIFYING APPARATUS

(71) Applicant: SAMSUNG ELECTRONICS CO., LTD., Suwon-si (KR)

(72) Inventor: Mineki Taoka, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 105 days.

(21) Appl. No.: 16/202,676

(22) Filed: Nov. 28, 2018

(65) Prior Publication Data

US 2019/0205019 A1   Jul. 4, 2019

(30) Foreign Application Priority Data

Dec. 28, 2017 (JP) .................................. 2017-254330
Aug. 2, 2018 (KR) ......................... 10-2018-0090521

(51) Int. Cl.
| | |
|---|---|
| *G06T 3/40* | (2006.01) |
| *G06T 11/60* | (2006.01) |
| *G06F 3/0481* | (2013.01) |
| *G06T 7/73* | (2017.01) |

(52) U.S. Cl.
CPC .......... *G06T 3/4007* (2013.01); *G06F 3/0481* (2013.01); *G06T 3/403* (2013.01); *G06T 7/73* (2017.01); *G06T 11/60* (2013.01)

(58) Field of Classification Search
CPC .................................................. G06T 3/4007
See application file for complete search history.

(56) References Cited

U.S. PATENT DOCUMENTS

| | | | |
|---|---|---|---|
| 7,324,709 B1* | 1/2008 | Wang ................... | G06T 3/4007 348/448 |
| 9,600,858 B1* | 3/2017 | Liu ........................ | G06T 3/4069 |
| 2004/0160439 A1 | 8/2004 | Xavier | |
| 2007/0230806 A1* | 10/2007 | Kimura ................ | G06K 9/4609 382/238 |
| 2011/0057933 A1* | 3/2011 | Lyashevsky ............ | G06T 7/238 345/428 |
| 2012/0230608 A1* | 9/2012 | Pan ........................ | G06T 3/403 382/300 |
| 2014/0010478 A1* | 1/2014 | Ndiour ................. | H04N 7/0142 382/300 |

(Continued)

FOREIGN PATENT DOCUMENTS

JP       2004-153668 A       5/2004

*Primary Examiner* — Phong X Nguyen
(74) *Attorney, Agent, or Firm* — Sughrue Mion, PLLC

(57) ABSTRACT

Provided is an image magnifying apparatus capable of suppressing generation of an interpolation pixel causing deterioration in image quality while considering correlation in an oblique direction in an image at the time of interpolation. The image magnifying apparatus includes: an input interface configured to receive an input signal including an image; at least one processor to implement: a selector configured to select one of a plurality of different interpolation methods, used for interpolating a pixel for an interpolation object position in the image, based on information about the interpolation object position and peripheral pixels thereof; and an interpolator configured to generate an interpolation pixel for an interpolation object position by applying the selected interpolation method; and an output interface configured to output a magnified image including the selected interpolation pixel.

9 Claims, 19 Drawing Sheets

(56) References Cited

U.S. PATENT DOCUMENTS

| | | | |
|---|---|---|---|
| 2015/0093039 A1* | 4/2015 | Li | G06T 3/4053 |
| | | | 382/266 |
| 2015/0288851 A1* | 10/2015 | Takashima | H04N 7/0142 |
| | | | 382/298 |
| 2016/0086308 A1* | 3/2016 | Matsumoto | G06T 3/4007 |
| | | | 382/300 |
| 2016/0117799 A1* | 4/2016 | Park | G06T 3/40 |
| | | | 382/109 |
| 2016/0364839 A1* | 12/2016 | Duan | G06K 9/4604 |
| 2016/0364840 A1* | 12/2016 | Zhang | H04N 1/3876 |

\* cited by examiner

IMAGE MAGNIFYING APPARATUS

CROSS-REFERENCE TO THE RELATED APPLICATIONS

This application claims priorities to Korean Patent Application No. 10-2018-0090521 filed on Aug. 2, 2018 in the Korean Intellectual Property Office and Japanese Patent Application No. 2017-254330 filed on Dec. 28, 2017 in the Japanese Intellectual Property Office, the disclosures of which are incorporated herein by reference in their entireties.

BACKGROUND

1. Field

Apparatuses and methods consistent with exemplary embodiments of the inventive concept relate to an image magnifying apparatus.

2. Description of Related Art

Demand for a technique of magnifying a low-resolution image to a high-resolution image is increasing, according to the spread of a high-resolution image display devices. To magnify a low-resolution image to a high-resolution image, in an image display device, an image magnifying apparatus interpolating and outputting a pixel of an image file constituting the image is provided. The image magnifying apparatus applies a process of interpolating pixels to increase the resolution of an input image and output the image. The image magnifying apparatus may calculate a correlation direction corresponding to a diagonal direction at a position of a pixel to be interpolated, and select a pixel existing in the correlation direction to perform the interpolation.

In a directional interpolation, pixels existing in a correlation direction from the position of a pixel as an interpolation object often exist in a position separated from the pixel as an interpolation object. Accordingly, the pixel value used for interpolation may be significantly different from the pixel value of the interpolation object. In this case, the generated interpolation pixel may have a pixel value significantly different from that of peripheral pixels, which may cause deterioration of an image quality. In addition, depending on the pattern around the interpolation object position, proper interpolation may not be performed by the directional interpolation. When the directional interpolation is performed under such conditions, an image quality may be deteriorated by generating pixels significantly different from peripheral pixels.

In addition, in the directional interpolation, it is necessary to smoothly connect lines in the diagonal direction to improve an image quality of an input image. In the directional interpolation in the related art, pixels close to a correlation direction detected in an interpolation object position are selected and used for interpolation. In this regard, a method for generating smoother diagonal lines in the diagonal direction is required. In addition, when a character is included in an image, a method of generating smoother diagonal lines included in lines of characters at the time of magnifying is required.

SUMMARY

Example embodiments of the inventive concept provide an image magnifying apparatus capable of suppressing generation of an interpolation pixel, causing a deterioration of image quality while taking into account correlation in an oblique direction in an image at the time of interpolation.

According to an example embodiment, there is provided an image magnifying apparatus which may include: an input interface configured to receive an input signal including an image; at least one processor to implement: a direction detector configured to detect a first correlation direction from an interpolation object position to peripheral pixels of the interpolation object position in the image including a plurality of pixels; a pixel selector configured to select at least one pixel to be used for interpolation based on the first correlation direction; a directional interpolator configured to generate a directional interpolation pixel for the interpolation object position by performing directional interpolation using the selected pixel; an arithmetic interpolator configured to generate an arithmetic interpolation pixel for the interpolation object position in a manner different from the directional interpolation; and a selector configured to select either the directional interpolation pixel or the arithmetic interpolation pixel as an interpolation pixel for the interpolation object position according to a first detection condition; and an output interface configured to output a magnified image including the selected interpolation pixel, wherein the first detection condition is whether a difference between information about the interpolation object position and information about the selected pixel is within a predetermined range.

The pixel selector may be further configured to detect a second correlation direction from the selected pixel to peripheral pixels of the selected pixel, and the difference between the information about the interpolation object position and the information about the selected pixel may be an angle difference between the first and second correlation directions in the image. In response to determining that the angle difference is within a predetermined range, the selector may select the directional interpolation pixel as the interpolation pixel for the interpolation object position.

According to an example embodiment, there is provided an image magnifying apparatus which may include: an input interface configured to receive an input signal including an image; at least one processor to implement: a direction detector configured to detect a correlation direction from an interpolation object position and peripheral pixels; a pixel selector configured to select at least one pixel to be used for interpolation based on the correlation direction; a directional interpolator configured to generate a directional interpolation pixel for the interpolation object position by performing directional interpolation using the selected pixel; an arithmetic interpolator configured to generate an arithmetic interpolation pixel for the interpolation object position in a manner different from the directional interpolation; and a selector configured to select either the directional interpolation pixel or the arithmetic interpolation pixel as an interpolation pixel for the interpolation object position based on information about a reference area including a predetermined number of peripheral pixels of the interpolation object position in the image; and an output interface configured to output a magnified image including the selected interpolation pixel.

The selector may determine a complexity level of the reference area, and select either the directional interpolation pixel or the arithmetic interpolation pixel as the interpolation pixel for the interpolation object position based on the complexity level of the reference area, and the complexity level of the reference area may be determined according to differences of pixel values between adjacent pixels in a horizontal direction in the image and differences of pixel values between adjacent pixels in a vertical direction in the image.

According to an example embodiment, there is provided an image magnifying apparatus which may include: an input interface configured to receive an input signal including an image; at least one processor to implement: a selector configured to select one of a plurality of different interpolation methods, used for interpolating a pixel for an interpolation object position in the image, based on information about the interpolation object position and peripheral pixels thereof; and an interpolator configured to generate an interpolation pixel for an interpolation object position by applying the selected interpolation method; and an output interface configured to output a magnified image comprising the selected interpolation pixel. Here, the selector may determines a histogram of pixel values of a reference area including the interpolation object position and a predetermined number of peripheral pixels, and, in response to the determining the histogram, the selector may select a first interpolation method adapted to interpolating a natural image or a second interpolation method adapted to interpolating a character line image.

BRIEF DESCRIPTION OF DRAWINGS

The above and other aspects, features, and advantages of the inventive concept will be more clearly understood from the following detailed description, taken in conjunction with the accompanying drawings, in which.

DETAILED DESCRIPTION OF EXAMPLE EMBODIMENTS

An embodiment provided in the following description is not excluded from being associated with one or more features of another example or another embodiment also provided herein or not provided herein but consistent with the inventive concept. For example, even if matters described in a specific embodiment are not described in a different embodiment, the matters may be understood as being related to or combined with the different embodiment, unless otherwise mentioned in descriptions thereof.

Meanwhile, when an embodiment can be implemented differently, functions or operations described in a particular block may occur in a different way from a flow described in the flowchart. For example, two consecutive blocks may be performed simultaneously, or the blocks may be performed in reverse according to related functions or operations.

The embodiments of the inventive concept described herein are all exemplary. However, the inventive concept is not limited thereto. Hereinafter, these embodiments will be described with reference to the accompanying drawings.

Figure 1:
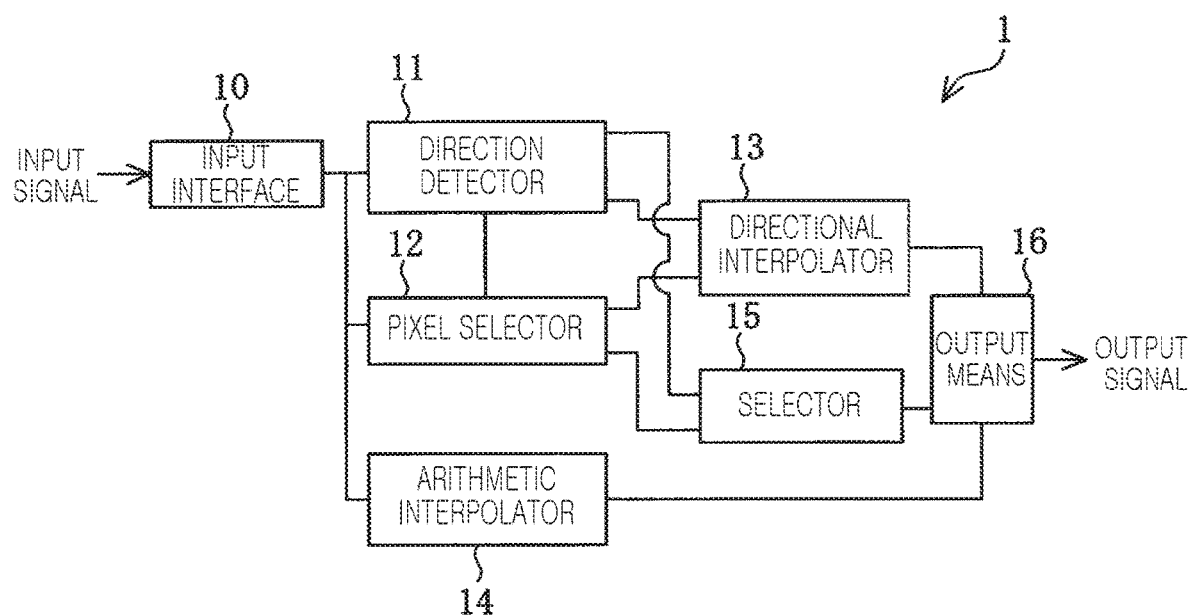
FIG. 1 is a block diagram illustrating a configuration of an image magnifying apparatus according to an embodiment.

FIG. 1 is a block diagram illustrating a configuration of an image magnifying apparatus according to an embodiment.

In an image magnifying apparatus 1 of FIG. 1, an image or image data including a plurality of pixels disposed in a lattice form may be input. The image magnifying apparatus 1 may insert interpolation pixels between the pixels of the input image, and output a magnified image.

The image magnifying apparatus 1 may include an input interface 10 receiving an input signal including an image. Further, the image magnifying apparatus 1 may include a direction detector 11 reading and processing the input image, a pixel selector 12, and an arithmetic interpolator 14. The direction detector 11 may detect a correlation direction from an interpolation object position to peripheral pixels. The pixel selector 12 may select one or more pixels required for directional interpolation. The pixels required for the directional interpolation may be selected based on the correlation direction detected by the direction detector 11. Further, the pixel selector 12 may detect a correlation direction at the position of the selected pixel. The arithmetic interpolator 14 generates an interpolation pixel for the interpolation object position by a method other than the directional interpolation. The interpolation method used by the arithmetic interpolator 14 may employ any method. For example, a bi-linear method, a bi-cubic method, or a Lanczos method may be used.

In addition, the image magnifying apparatus 1 may include a directional interpolator 13. The directional interpolator 13 may generate interpolating pixels by the directional interpolation based on the correlation direction detected by the direction detector 11 and the pixels selected by the pixel selector 12. The image magnifying apparatus 1 may also include an selector 15 which selects either an interpolation pixel generated by the directional interpolator 13 (hereafter "a directional interpolation pixel") or an interpolation pixel generated by the arithmetic interpolator, based on the correlation direction at the interpolation object position detected by the direction detector 11 and the correlation direction at the position at the selected pixel detected by the pixel selector 12.

The image magnifying apparatus 1 may include an output interface 16 outputting the interpolation pixel selected by the selector 15. The image magnifying apparatus 1 may insert interpolation pixels for all or most of the pixels included in the image, and generate a magnified image, that is, a pixel-interpolated image. Hereinafter, a disposition relationship of interpolation pixels will be described with reference to FIGS. 2 and 3. For convenience of explanation, it is assumed that an image input according to the embodiment is magnified twice in the horizontal direction and in the vertical direction, respectively.

Figure 2:
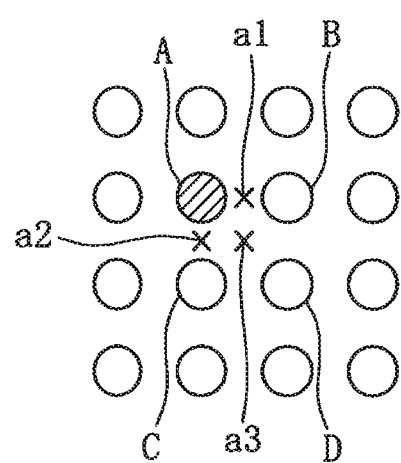
FIG. 2 is a diagram illustrating a disposition relationship of pixels included in an image and interpolation object positions according to an embodiment.
Figure 3:
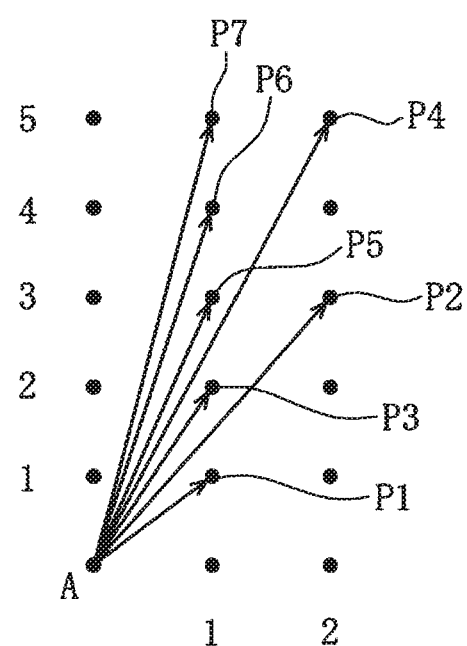
FIG. 3 is a diagram illustrating a standardized direction as a direction based on a specific pixel according to an embodiment.

FIG. 2 is a diagram illustrating a disposition relationship of pixels included in an image and interpolation object positions according to an embodiment. On the other hand, FIG. 3 is a diagram illustrating a standardized direction as a direction based on a specific pixel in an embodiment.

An interpolation pixel for pixel A may be generated at an interpolation object position a1 between pixel A and pixel B, at an interpolation object position a2 between pixel A and pixel C, and at an interpolation object position a3 between pixel A and pixel D, respectively. The interpolation object position a1 may be adjacent to pixel A and pixel B disposed side to side in a horizontal direction. The interpolation object position a2 may be adjacent to pixel A and pixel C disposed up and down in a vertical direction. The interpolation object position a3 may be adjacent to peripheral pixels A, B, C and D in an oblique direction.

Next, the directional interpolation will be described. The directional interpolation detects a correlation direction from an image, and selects a pixel for interpolation from a direction parallel to the correlation direction. Accordingly, deterioration of an edge by magnification of an image may be suppressed. A Sobel filter may be used to detect a correlation direction at an interpolation object position. However, the directional detection method is not limited to thereto, for example, other methods such as a Prewitt filter may be used.

When the directional interpolation is performed, information about a correlation direction may be required to select pixels to be used for interpolation. Since pixels of an image are arranged horizontally and vertically at a regular interval, angle information necessary for selecting the pixels may be standardized on the basis of disposition of the pixels. Referring to FIG. 3, a direction toward pixel P1 separated by one pixel in the horizontal direction and one pixel in the vertical direction based on pixel A may be defined as [1]. A direction toward pixel P2 separated by two pixels in the horizontal direction and three pixels in the vertical direction based on pixel A may be [2/3]. Similarly, a direction from pixel A toward pixel P3 is [2], and a direction from pixel A toward pixel P4 is [5/2]. Further, a direction from pixel A toward pixel P5 is [3], a direction from pixel A toward pixel P6 is [4], and a direction from pixel A toward pixel P7 is [5]. An angle range to direction [1] is expressed by the reciprocal of these numerical values, from the horizontal direction based on pixel A. In addition, the directions described so far are directions toward a first upper limit and a third upper limit. On the other hand, directions toward a second upper limit and a fourth upper limit may be expressed as negative directions.

Figure 4:
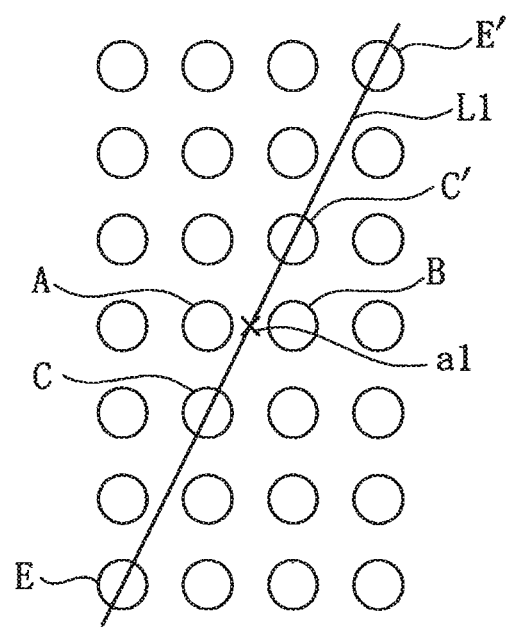
FIG. 4 is an explanatory diagram of a selected pixel in a case in which the center of the pixel exists in a correlation direction at an interpolation object position.

FIG. 4 is an explanatory diagram of a selected pixel in a case in which the center of the pixel exists in a correlation direction at an interpolation object position. Further, FIG. 5 is an explanatory diagram of a selected pixel in a case in which the center of the pixel does not exist in the correlation direction at the interpolation object position.

The directional interpolation method will be described with reference to FIGS. 4 and 5. As described above, the direction detector 11 may detect a correlation direction at an interpolation object position. In an embodiment illustrated in FIG. 4, the correlation direction detected by the direction detector 11 may be direction [2]. In the embodiment of FIG. 4, the centers of pixel C and pixel C' exist on a line L1 from an interpolation object position a1 in the correlation direction. When the center of a pixel exists on the line L1, the pixel selector 12 may select two pixels closest to the interpolation object position on the line L1. Based on the selected two pixels, the directional interpolator 13 may generate a directional interpolation pixel at the interpolation object position a1. As a method for generating the directional interpolation pixel, for example, a bi-linear method may be used. However, other methods may be used.

Further, on the line L1, pixel E and pixel E', which are the second closest to the interpolation object position a1 may exist. The pixel selector 12 may select pixel E and pixel E' in addition to pixel C and a pixel C'. When four pixels are selected, the directional interpolator 13 may use an interpolation method using four pixels, for example, a bi-cubic method.

Figure 5:
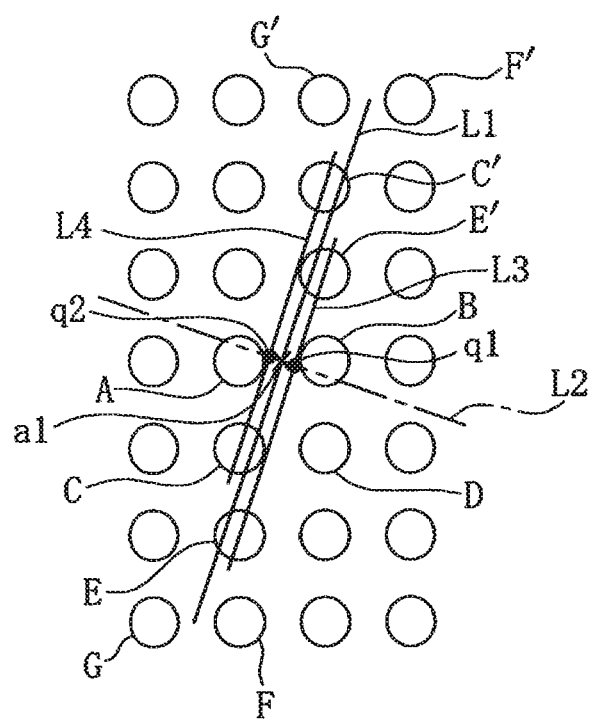
FIG. 5 is an explanatory diagram of a selected pixel in a case in which the center of the pixel does not exist in a correlation direction at an interpolation object position.

In an embodiment illustrated in FIG. 5, a case in which a correlation direction detected by the direction detector 11 is direction [3] is disclosed. In the embodiment of FIG. 5, the center of a pixel does not exist on the line L1 from the interpolation object position a1 in the correlation direction detected by the direction detector 11. In this case, a line L2 which is perpendicular to the line L1 is also defined. Next, as a line parallel to the line L1, a line passing through the center of another pixel may be defined by the pixel selector 12. These lines may be defined in plural. Among these lines, a line L3 passing through the center of pixel E and pixel E' and a line LA passing through the center of pixel C and pixel C' may be selected, as the closest to the line L1, and a point of intersection of the line L3 and the line L2 may be defined as a point for interpolation q1. The pixel value of the point for interpolation q1 may be calculated from the pixel values of pixel E and pixel E'. Further, an intersection point of the line LA and the line L2 may be defined as a point for interpolation q2. The pixel value of the point for interpolation q2 may be calculated from the pixel values of pixel C and pixel C'. For calculation of each point for interpolation, the bi-linear method is used. From the points for interpolation q and q2, by the bi-linear method, the pixel at the interpolation object position a1 may be generated. By using the above method, two points for interpolation may be similarly calculated in the case of an interpolation object position, and a directional interpolation pixel may be generated by using the bi-linear method.

Figure 6:
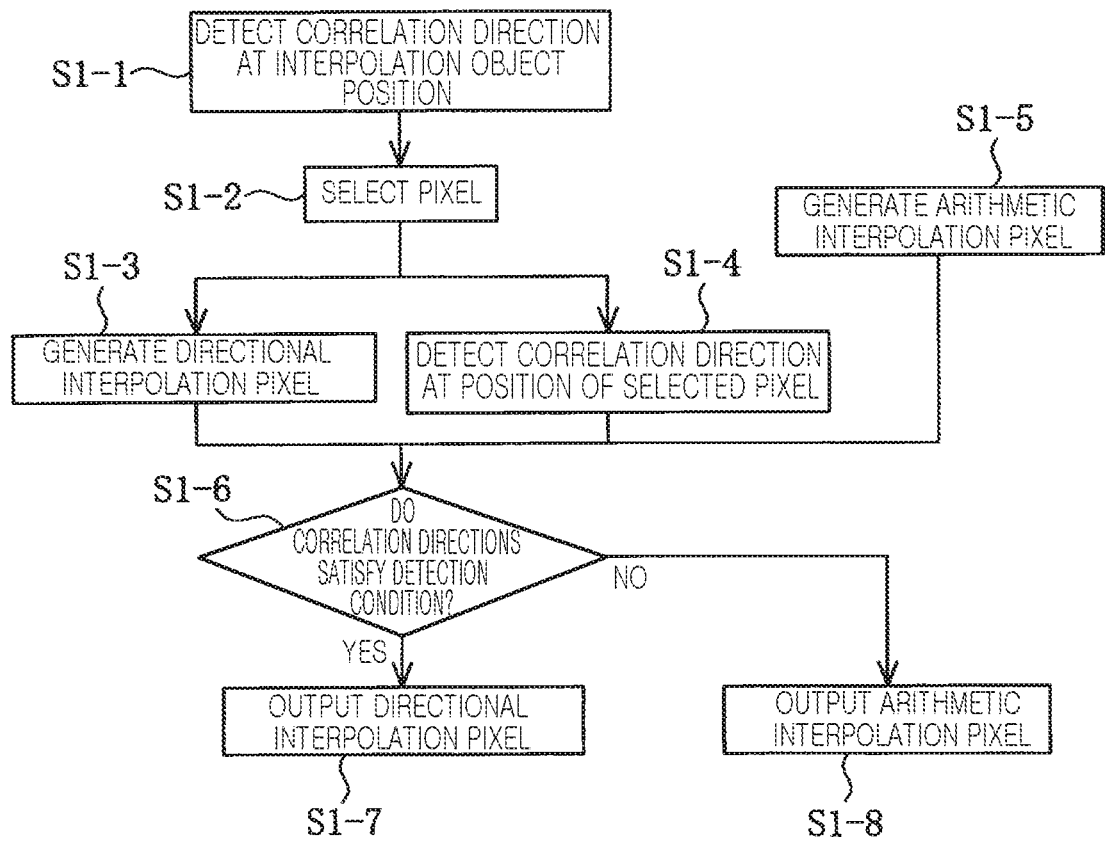
FIG. 6 is a flow chart illustrating an operating method of an image magnifying apparatus according to an embodiment.

FIG. 6 is a flow chart illustrating an operating method of an image magnifying apparatus according to an embodiment.

In FIG. 6, first, the direction detector 11 may detect a correlation direction with respect to an interpolation object position (S1-1). Next, the pixel selector 12 may select at least one pixel to be used for interpolation based on the correlation direction detected by the direction detector 11 (S1-2). The selection of the pixel may be performed as described above.

When the pixel to be used for interpolation is selected, the directional interpolator 13 may generate a directional interpolation pixel (S1-3). Further, the pixel selector 12 may detect a correlation direction at the selected pixel (S1-4). Here, the correlation direction may be detected for all the selected pixels if a plurality of pixels were selected by the pixel selector 12 for interpolation. On the other hand, apart from the directional interpolation, the arithmetic interpolator 14 may generate an arithmetic interpolation pixel for the interpolation object position by using an arithmetic interpolation method (S1-5).

Next, whether the correlation direction detected in S1-1 and the correlation direction detected in S1-4 satisfy a predetermined detection condition, in which, for example, the difference between the two correlation directions is included in a preset range, may be determined (S1-6). The range may be preset according to the angle difference in the plus direction and the angle difference in the minus direction. The angle difference is set to a standardized angle, as described above. The range may be set according to the angle difference in the plus direction and the angle difference in the minus direction. The angle difference is set to a standardized angle, as described above. For example, the range may be set to between −1 to +1. However, the range may be arbitrarily set. For example, when the range is widened, the directional interpolation is used more, and thus, an oblique line may be smoothed. On the other hand, by widening the range, noise due to an interpolation error generated in the directional interpolation may increase. When the range is narrowed, such noise may be suppressed but a juggy of the oblique line may increase.

When the detection condition is satisfied in a step S1-6, the selector 15 may select the directional interpolation pixel, the output interface 16 may output the directional interpolation pixel (S1-7). When the detection condition is not satisfied in S1-6, the selector may select the arithmetic interpolation pixel, the output interface 16 may output the arithmetic interpolation pixel (S1-8).

In the above embodiment, the step S1-6 is performed after the directional interpolation pixel and the arithmetic interpolation pixel are respectively generated. However, the inventive concept is not limited thereto. According to an embodiment, the step S1-6 may be performed before the directional interpolation pixel and the arithmetic interpolation pixel are generated, and thus, only one of these two interpolation pixels may be generated according to a result of the step S1-6.

The directional interpolation pixel may have a pixel value significantly different from pixel values of the peripheral pixels, so that noise may increase. Noise may easily occur when the direction of a pixel to be used for interpolation is significantly different from the direction of an interpolation object position. As described so far, the image magnifying apparatus 1 compares the correlation direction at the interpolation object position with the correlation direction at a pixel to be used for interpolation. The image magnifying apparatus 1 outputs an interpolation pixel generated by a method different from the directional interpolation, when the difference of the directions is large. Thus, noise to be generated from the directional interpolation may be suppressed, and a high quality magnified image may be obtained.

Figure 7:
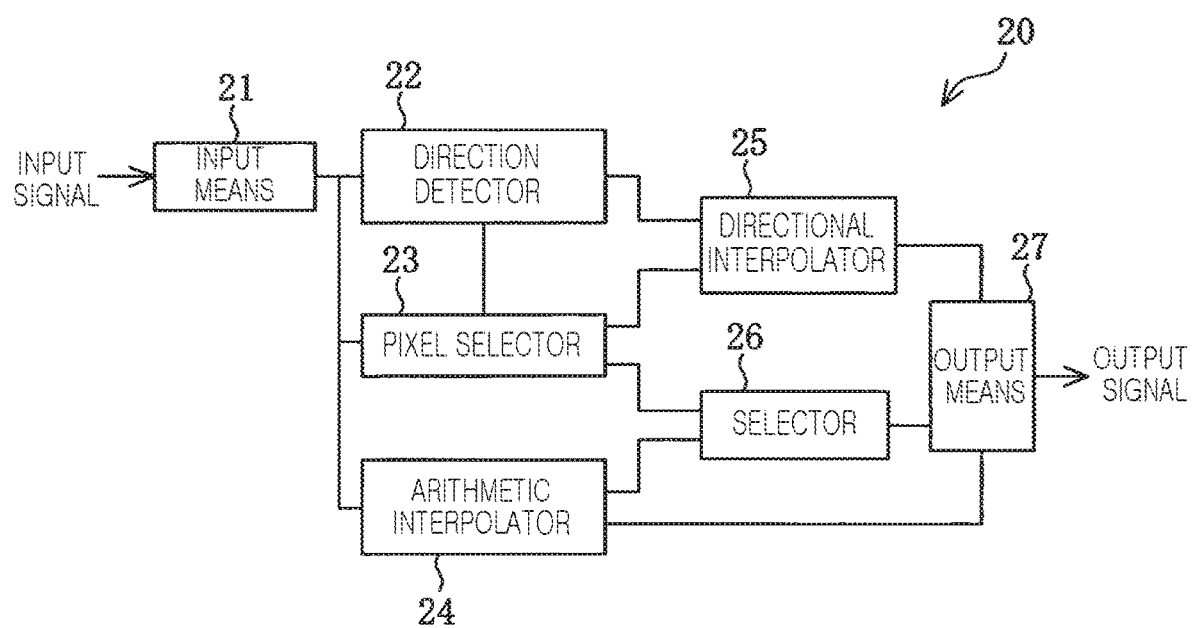
FIG. 7 is a block diagram illustrating a configuration of an image magnifying apparatus according to an embodiment.

FIG. 7 is a block diagram illustrating a configuration of an image magnifying apparatus according to an embodiment.

Referring to FIG. 7, an image magnifying apparatus 20 according to an embodiment may include an input means 21 receiving an input signal. An image included in the input signal input by the input means 21 may be transmitted to a direction detector 22, a pixel selector 23, and an arithmetic interpolator 24. The direction detector 22 may detect a correlation direction at an interpolation object position. The pixel selector 23 may select a plurality of pixels to be used for directional interpolation. The arithmetic interpolator 24 may generate an arithmetic interpolation pixel using a method different from a method of directional interpolation. The detection of the correlation direction or the selection of pixels, the method of arithmetic interpolation, by the image magnifying apparatus 20 may be similar to those performed by the image magnifying apparatus 1 of FIG. 1.

A directional interpolator 25 may generate a directional interpolation pixels by using the correlation direction detected by the direction detector 22 and the pixels selected by the pixel selector 23. The directional interpolation may be performed similar to that described above with reference to FIGS. 2 to 6, and the like.

A selector 26 may compare the pixel values of the selected pixels with the pixel value of the arithmetic interpolation pixel. The selector 26 may select the directional interpolation pixel when the difference between the pixel values compared above satisfies a detection condition in which all of the differences between the pixel values compared above are within a preset range. Further, the selector 26 may select the arithmetic interpolation pixel when the difference between the pixel values compared above does not satisfy the detection condition. The range of the detection condition may be arbitrarily preset. When the range is widened, the ratio using the directional interpolation becomes larger, and accordingly, an oblique line may be made smother while noise generated by the directional interpolation may increase. When the range is narrowed, such noise may be suppressed, but a juggy of the oblique line may increase.

Figure 8:
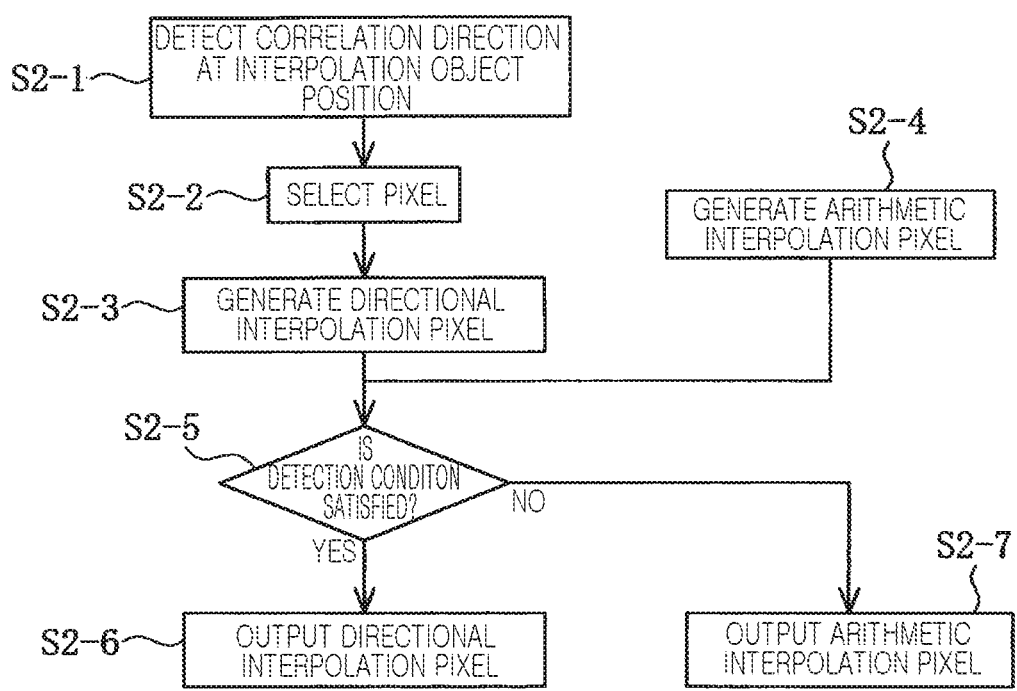
FIG. 8 is a flow chart illustrating an operating method of an image magnifying apparatus according to an embodiment.

FIG. 8 is a flow chart illustrating an operating method of an image magnifying apparatus according to an embodiment.

In FIG. 8, first, the direction detector 22 may detect a correlation direction at an interpolation object position (S2-1). Next, the pixel selector 23 may select a plurality of pixels to be used for interpolation based on the correlation direction detected by the direction detector 22 (S2-2). Using the correlation direction detected in S2-1, the directional interpolator 25 may generate a directional interpolation pixel (S2-3). In addition, the arithmetic interpolator 24 may also generate an arithmetic interpolation pixel (S2-4).

The selector 26 may determine whether the above-described detection condition is satisfied with respect to the selected pixels and the arithmetic interpolation pixel (S2-5). When each of the selected pixel satisfies the detection condition, the selector 26 may select the directional interpolation pixel, and the output interface 27 may output this directional interpolation pixel selected by the selector 26 (S2-6). When any of the selected pixels does not satisfy the detection condition, the selector 26 may select the arithmetic interpolation pixel, and the output interface 27 may output this arithmetic interpolation pixel (S2-7).

When the pixel value of the pixel to be used for interpolation is significantly different from the pixel value around the interpolation object position, noise generated by the directional interpolation may increase. As described so far, the image magnifying apparatus 20 according to an embodiment may compare the pixel value of a pixel to be used for interpolation with the pixel value of an arithmetic interpolation pixel. When the difference is large, the image magnifying apparatus 20 may output the arithmetic interpolation pixel. Thus, generation of noise due to the directional interpolation may be suppressed, and a high quality magnified image may be obtained.

Figure 9:
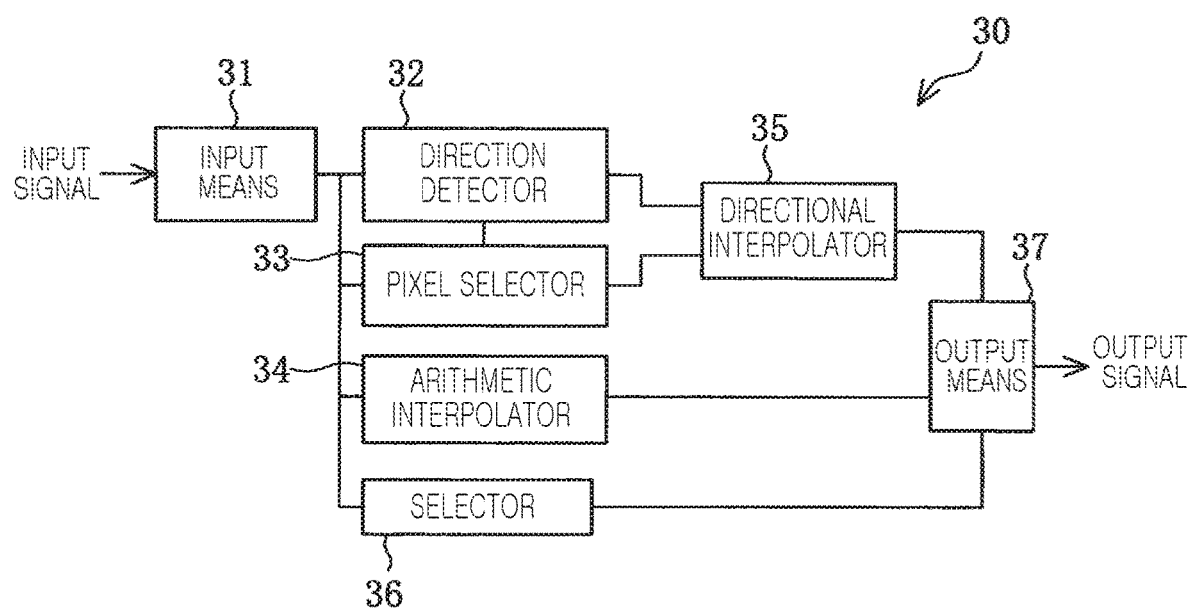
FIG. 9 is a block diagram illustrating a configuration of an image magnifying apparatus according to an embodiment.

FIG. 9 is a block diagram illustrating a configuration of an image magnifying apparatus according to an embodiment.

As illustrated in FIG. 9, an image magnifying apparatus 30 may include an input interface 31 receiving an input signal. The input interface 31 may transmit an image included in the input signal to a direction detector 32, a pixel selector 33, an arithmetic interpolator 34, a selector 36, and the like. The direction detector 32 may detect a correlation direction at an interpolation object position. The pixel selector 33 may select at least one pixel to be used for directional interpolation. The arithmetic interpolator 34 may generate an arithmetic interpolation pixel using a method other than the directional interpolation. The method of detecting the correlation direction, the selection of the pixel and the arithmetic interpolation in the present embodiment may be similar to the other embodiments described above.

The selector 36 may extract a reference area including peripheral pixels of the interpolation object position from the image and evaluate complexity of the reference area. The selector 36 may select a directional interpolation pixel generated by directional interpolation when the complexity of the reference area is low. On the other hand, when the complexity of the reference area is high, the selector 36 may select an arithmetic interpolation pixel generated by arithmetic interpolation. The evaluation of the complexity will be described later.

The directional interpolator 35 may generate the directional interpolation pixel based on the correlation direction detected by the direction detector 32 and the pixel selected by the pixel selector 33. The method of directional interpolation may be similar to the other example embodiments described above.

Figure 10:
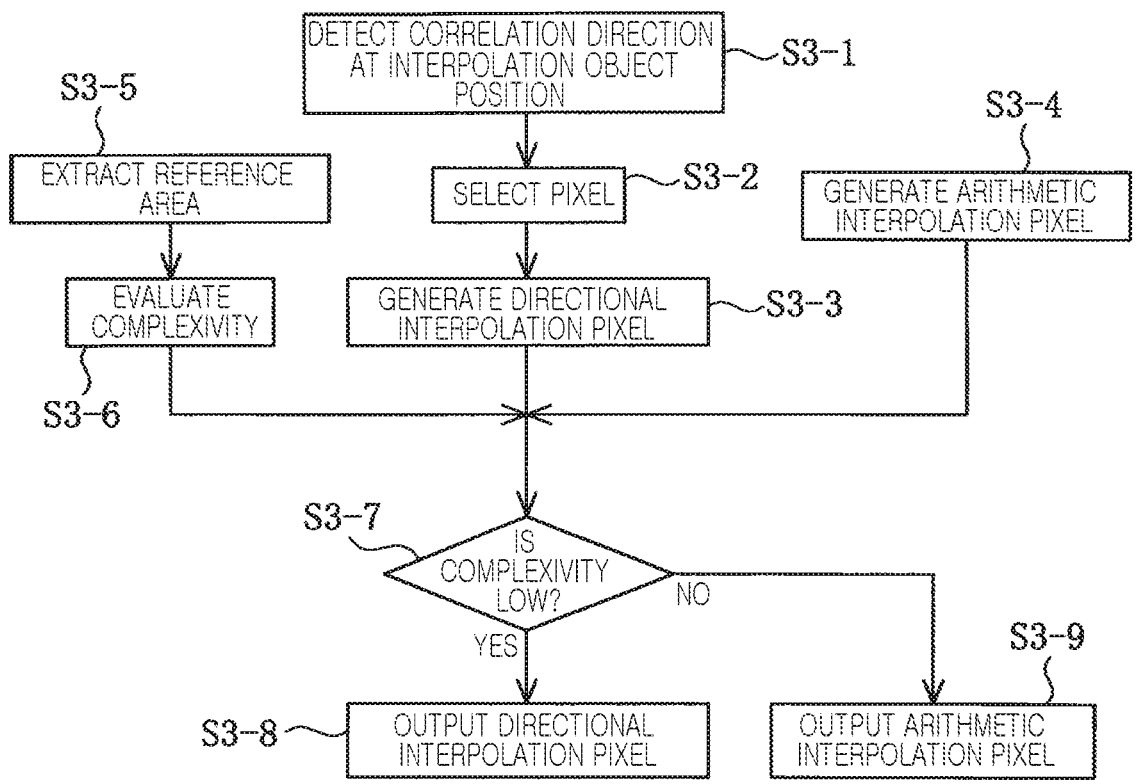
FIG. 10 is a flow chart illustrating an operating method of an image magnifying apparatus according to an embodiment.
Figure 11A:
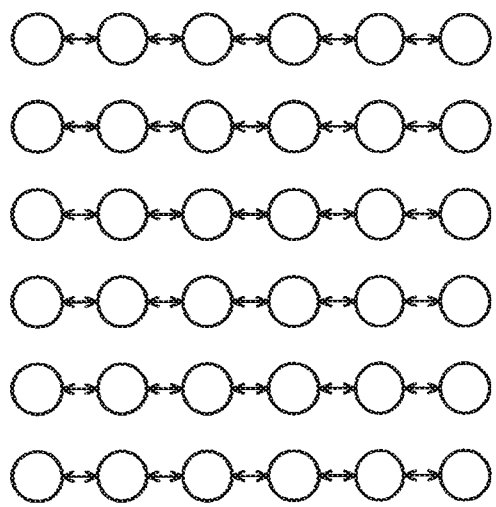
FIGS. 11A and 11B are diagrams illustrating contents of an operation performed on a reference area according to an embodiment.
Figure 11B:
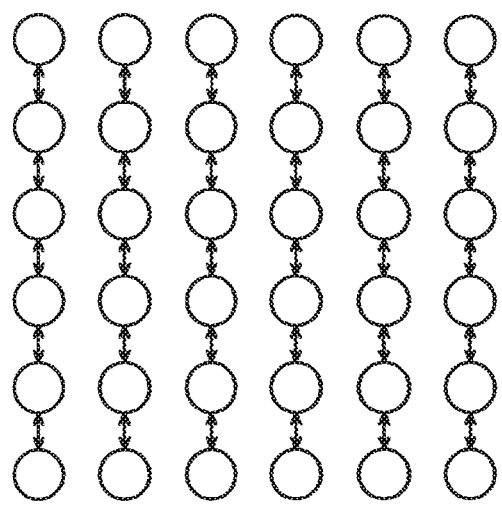

FIG. 10 is a flow chart illustrating an operating method of an image magnifying apparatus according to an embodiment. On the other hand, FIGS. 11A and 11B are diagrams illustrating contents of an arithmetic operation performed on a reference area according to an embodiment.

A method of generating and outputting an interpolation pixel according to an embodiment will be described with reference to FIGS. 10, 11A and 11B. First, the direction detector 32 may detect a correlation direction at an interpolation object position (S3-1). Next, the pixel selector 33 may select at least one pixel to be used for directional interpolation based on the correlation direction (S3-2). The directional interpolator 35 may generate a directional interpolation pixel based on the correlation direction and the selected pixel (S3-3). In addition, the arithmetic interpolator 34 may generate an arithmetic interpolation pixel (S3-4). The directional interpolator may generate the directional interpolation pixel using directional interpolation, and the arithmetic interpolator may generate the arithmetic interpolation pixel using a method different from the directional interpolation.

The selector 36 may define a reference area including peripheral pixels of the interpolation object position in the image (S3-5). In an example embodiment, as illustrated in FIGS. 11A and 11B, the reference area may be a square area including six pixels in the horizontal direction and six pixels in the vertical direction. Next, the selector 36 may evaluate complexity of the extracted reference area (S3-6). To evaluate the complexity of the reference area, the selector 36 may calculate DR, which is the difference between the maximum pixel value and the minimum pixel value in the reference area. Further, as illustrated in FIGS. 11A and 11B, the selector 36 may calculate the differences between pixel values of pixels adjacent in the horizontal direction in the reference area, the sum ActH of the absolute values of the calculated differences, the differences between pixel values of pixels adjacent in the vertical direction in the reference area, and the sum ActV of the absolute values of the calculated differences.

The selector 36 may determine whether the calculated values satisfy the first to fifth conditions shown below. In each condition, a1, a2, a3, and a4 may be values which are arbitrarily set, respectively. When at least one of the first to fifth conditions is satisfied, the selector 36 may determine that the complexity of the reference area is high. On the other hand, when all the first to fifth conditions are not satisfied, the selector 36 may determine that the complexity of the reference area is low.

$ActH + ActV > a1 \times DR$     First condition:

$ActH > a2 \times DR$     Second condition:

$ActV > a2 \times DR$     Third condition:

$ActH > a3$ and, $ActH + 2 \times ActV > \alpha 1 \times DR$     Fourth condition:

$ActV > a4$ and, $ActV + 2 \times ActH > \alpha 1 \times DR$     Fifth condition:

The selector 36 may detect whether the complexity of the reference area is low (S3-7). When the complexity of the reference area is low, the selector 36 may select the directional interpolation pixel, and when the complexity of the reference area is high, the selector 36 may select the arithmetic interpolation pixel. An output interface 37 may output the selected interpolation pixel (S3-8).

When the reference area defined at around the interpolation object position has a complexity of more than a certain level, noise may increase by using directional interpolation. As described so far, an image magnifying apparatus 30 according to an embodiment may define the reference area around the interpolation object position and evaluate the complexity of the reference area. Further, the image magnifying apparatus 30 may output the interpolation pixel generated by a method other than directional interpolation. Thus, generation of noise in an area in which a complexity is high may be suppressed, and a high quality magnified image may be obtained.

Figure 12:
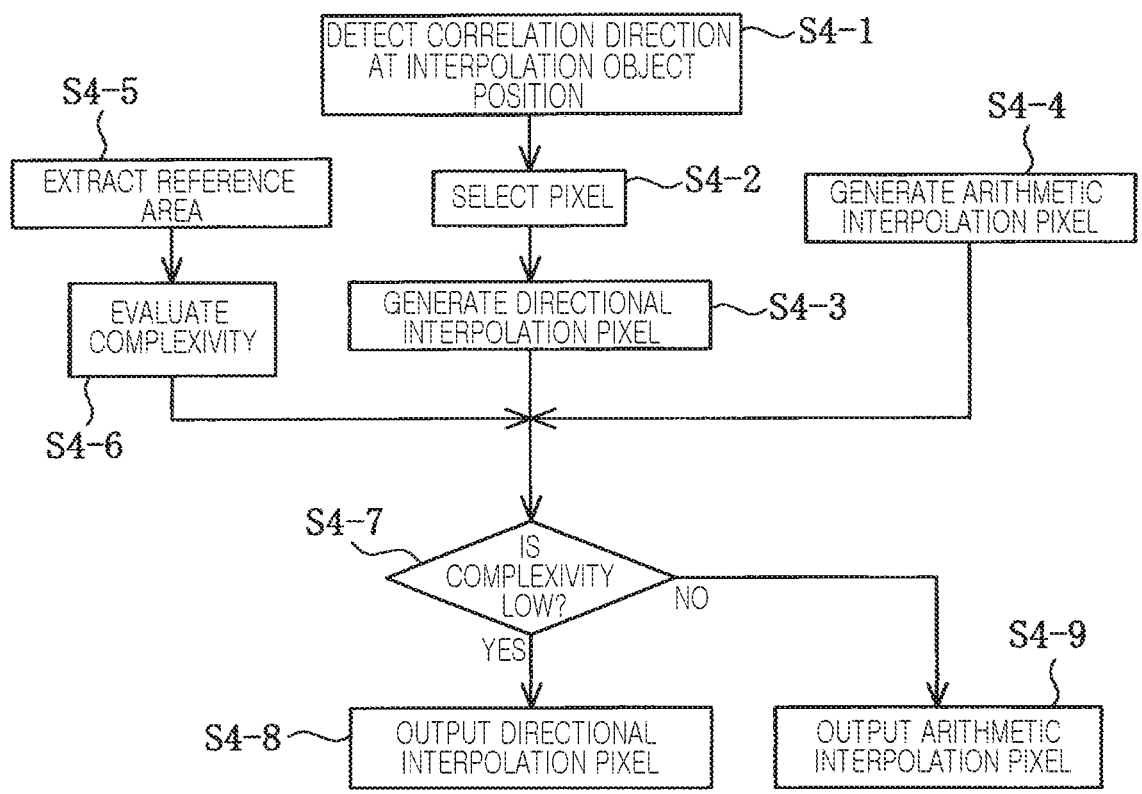
FIG. 12 is a flow chart illustrating an operating method of an image magnifying apparatus according to an embodiment.

FIG. 12 is a flow chart illustrating an operating method of an image magnifying apparatus according to an embodiment, and FIG. 14 is a diagram illustrating a pattern of a detection area having an end of a line segment according to an embodiment. Hereinafter, a configuration and an operation of the image magnifying apparatus 30 will be described with reference to FIGS. 12, 13 and 14A to 14H.

According to FIG. 12, an operation of the selector 36 of the image magnifying apparatus 30 of FIG. 9 may be different from that of the selector 36 to perform the operation of FIG. 10. Selection of an interpolation pixel by the selector 36 will be described later.

In FIG. 12, first, the direction detector 32 may detect a correlation direction at an interpolation object position (S4-1). Next, a pixel selector 33 may select at least one pixel to be used for interpolation based on the correlation direction detected by the direction detector 32 (S4-2). Using the correlation direction detected in S4-1 and the pixel selected in S4-2, a directional interpolator 35 may generate a directional interpolation pixel (S4-3). In addition, an arithmetic interpolator 34 may generate an arithmetic interpolation pixel (S4-4).

Figure 13:
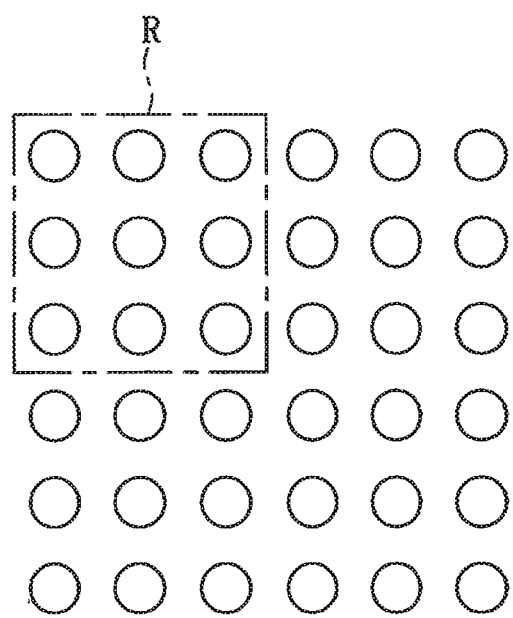
FIG. 13 is a diagram illustrating a relationship between a reference area and a detection area in an embodiment.
Figure 14A:
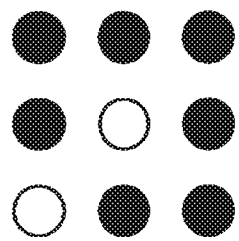
FIGS. 14A to 14H are diagrams illustrating a pattern of a discrimination area having an end of a line segment in an embodiment.
Figure 14B:
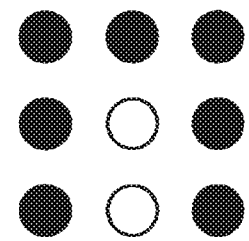
Figure 14C:
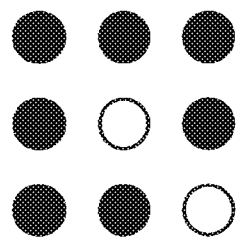
Figure 14D:
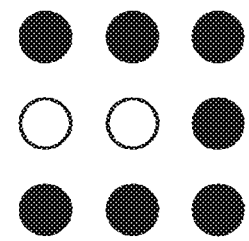
Figure 14E:
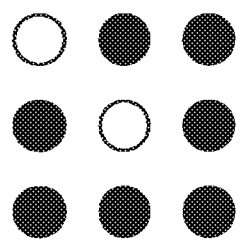
Figure 14F:
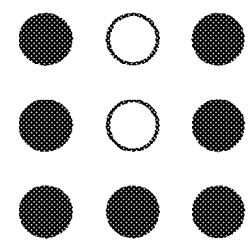
Figure 14G:
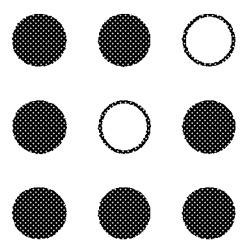
Figure 14H:
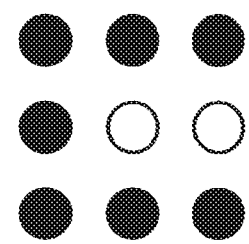

The selector 36 may extract a reference area including peripheral pixels of the interpolation object position from the image data (S4-5). For example, the reference area, as illustrated in FIG. 13, may be a square area including six pixels in the horizontal direction and six pixels in the vertical direction. The selector 36 may extract a detection area R, having three pixels in the horizontal direction and three pixels in the vertical direction, in the reference area. The detection area R may include a left upper end pixel of a reference area. Three other areas shifted by one pixel to the right from the detection area R illustrated in FIG. 13 may be extracted as the discrimination area. In addition, areas in which the detection area R and the above three areas are shifted downward by one pixel, respectively, may be extracted as the detection area. As a result, in the embodiment of FIG. 13, a total of 16 areas may be extracted as the detection area.

Next, the selector 36 may determine whether the end of a line segment exists for each of the detection areas extracted from the reference area. This determination is made as to whether the detection area R matches a pattern of a preset area. Example patterns of a preset area are illustrated in FIGS. 14A to 14H in which white pixels are line segments. In an area having three pixels in the horizontal direction and three pixels in the vertical direction, the pattern in which the end of a line segment is present is a case in which a pixel in the center of the area and any one of the eight peripheral pixels constitute a line segment. Therefore, as illustrated in FIGS. 14A to 14H, eight different patterns may exist in the detection area R.

Since the pattern of a preset area is a pattern of binarized pixel values, the detection area R may also be binarized and classified. Accordingly, the selector 36 may calculate a difference DR between the maximum value Max and the minimum value Min of pixel values in the detection area R, classify the pixel values of each pixel included in the detection area R based on a threshold value of DR/2+Min, and the detection area R may be binarized. With respect to the binarized detection area R, the selector 36 detects whether it matches any one of the patterns shown in FIGS. 14A to 14H. The selector 36 may detect that an end of a line segment exists in the reference area, when any one of the detection areas R matches any one of the patterns shown in FIGS. 14A to 14H.

The selector 36 may select a directional interpolation pixel when the end of a line segment is not detected as a result of determination of the end of a line segment in the reference area in S4-6 (S4-7). Then, the output interface 37 may output the directional interpolation pixel (S4-8). On the other hand, the selector 36 may select the arithmetic interpolation pixel when the end of a line segment is detected as a result of the determination of the end of a line segment in the reference area in S4-6 (S4-7). The, the output interface 37 may output the arithmetic interpolation pixel (S4-9).

In the case in which the end of a line segment exists in the reference area, detection of a correlation direction for directional interpolation may not be normally performed. As described so far, the image magnifying apparatus 30 may determine whether the end of a line segment around the interpolation object position exists in the reference area. In addition, the image magnifying apparatus 30 may output an interpolation pixel generated by a method different from the directional interpolation, when the end of a line segment exists in the reference area. Accordingly, noise that may be generated in the vicinity of the position of the end of a line segment may be suppressed, and a high quality magnified image may be obtained.

Figure 15:
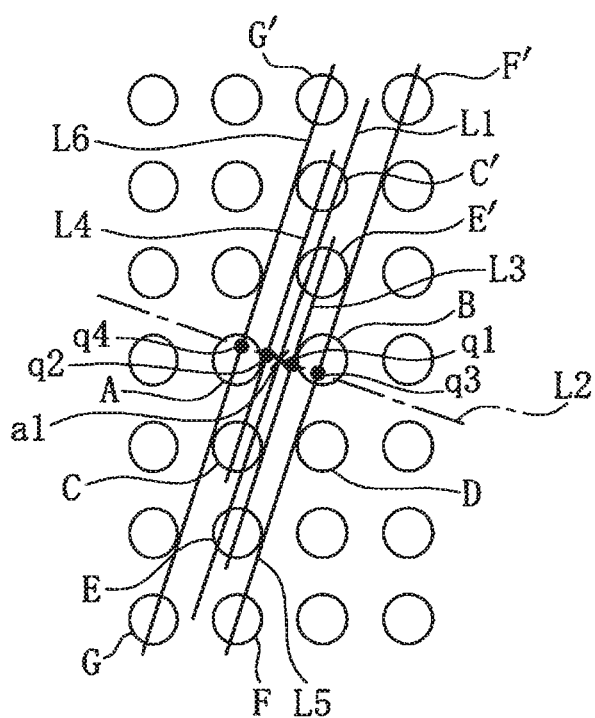
FIG. 15 is an explanatory diagram of a selected pixel in a case in which a pixel does not exist in a correlation direction at an interpolation object position.

FIG. 15 is an explanatory diagram of a selected pixel in a case in which a pixel does not exist in a correlation direction at an interpolation object position.

Hereinafter, the image magnifying apparatus 1 will be described with reference to FIGS. 15 and 1. According to FIG. 15, a method of directional interpolation of the image magnifying apparatus 1 may be different from that described above with reference to FIGS. 2 to 6.

The direction detector 11 may detect a correlation direction at an interpolation object position. When the center of the pixel is present on a line in the correlation direction detected at the interpolation object position, the pixel selector 12 may select at least one pixel as described above with reference to FIGS. 2 to 6. The directional interpolator 13 may generate a directional interpolation pixel for the interpolation object position based on the pixel selected by the pixel selector 12 using a bi-linear method, a bi-cubic method, or the like not being limited thereto.

The case in which the center of a pixel does not exist on the line in the correlation direction detected from the interpolation object position will be described with reference to FIG. 15. For example, for convenience of explanation, the direction of the interpolation object position a1 may be direction [3].

First, a line L1 in direction [3] passing through an interpolation object position a1, a line L2 which perpendicular to the line L1 may be defined. Next, a line parallel to the line L1 and passing through the center of the other pixel may be defined by the pixel selector 12. For example, a plurality of such lines may be present. Among these lines, a line L3 passing through the centers of pixel E and pixel E' and a line LA passing through the centers of pixel C and pixel C' may be selected as the closest to the line L1. An intersection point of the line L3 and the line L2 may be defined as a point for interpolation q1. The pixel value of the point of interpolation q1 may be calculated from the pixel values of pixel E and pixel E'. In addition, an intersection point of the line LA and the line L2 may be defined as a point for interpolation q2. The pixel value of the point for interpolation q2 may be calculated from the pixel values of pixel C and pixel C'. In addition, a line L5 passing through the centers of pixel F and pixel F' and a line L6 passing through the centers of pixel G and pixel G' may be defined as lines adjacent to the line L1 next to the line L3 or the line LA. An intersection point of the line L5 and the line L2 may be defined as a point for interpolation q3. The pixel value of the point for interpolation q3 may be calculated from the pixel values of pixel F and pixel F'. Further, an intersection point of the line L6 and the line L2 may be defined as a point for interpolation q4. The pixel value of the point for interpolation q4 may be calculated from the pixel values of pixel G and pixel G'. For calculation of each point for interpolation, for example, a bi-linear method may be used.

From the four points for interpolation q1, q2, q3, and q4, the pixel of a1 of the interpolation object position may be generated by the bi-cubic method. As described above, the pixel values of four points for interpolation may be calculated using the actually existing pixels in the correlation direction detected from the interpolation object position. Accordingly, the directional interpolation pixel may be generated using the bi-cubic method. By using the bi-cubic method for generating the directional interpolation pixel, a diagonal line having high sharpness may be generated. In cases of other correlation directions and interpolation object positions, similarly, four points for interpolation may be calculated, and directional interpolation pixels may be generated using the bi-cubic method.

Figure 16:
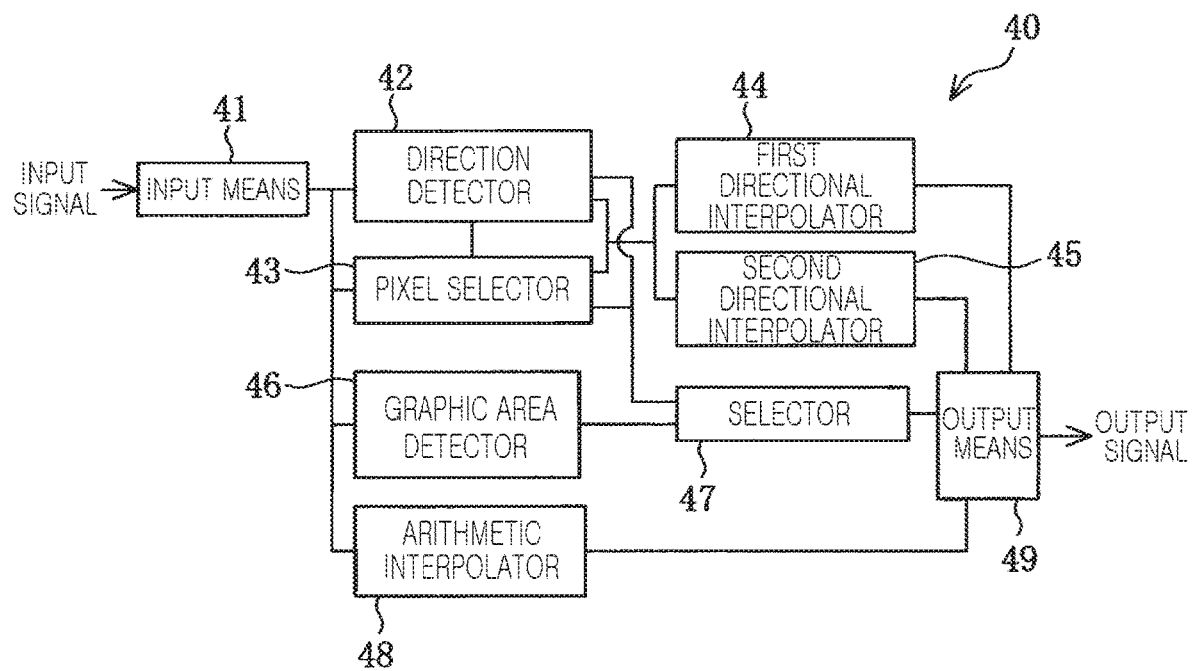
FIG. 16 is a block diagram illustrating a configuration of an image magnifying apparatus according to an embodiment.

FIG. 16 is a block diagram illustrating a configuration of an image magnifying apparatus according to an embodiment.

Next, an image magnifying apparatus 40 according to an embodiment will be described with reference to FIG. 16. For the directional interpolation described above with reference to FIGS. 1 to 6, a bi-linear method is used, and this bi-linear method is referred to as a first directional interpolation method in the present embodiment. Directional interpolation described with reference to FIG. 16 may use a bi-cubic method. This bi-cubic method is referred to as a second directional interpolation method in the present embodiment. The first directional interpolation method is an interpolation method in which diagonal lines are smooth and ringing is difficult to occur. On the other hand, according to the first directional interpolation method, the sharpness of oblique lines may be insufficient. The second directional interpolation method may improve the sharpness of the oblique lines. On the other hand, the second directional interpolation method is a method to easily cause ringing. The first directional interpolation method may be suitable for a graphic image such an image of a personal computer (PC), and the like. The second directional interpolation method may be suitable for a natural image. In an embodiment, according to the types of images at the interpolation object position, the directional interpolation method may be switched.

As illustrated in FIG. 16, an image magnifying apparatus 40 of the present embodiment may include an input interface 41 receiving an input signal. The input interface 41 may transmit an image included in the input signal to a direction detector 42, a pixel selector 43, a graphic area detector 46 and an arithmetic interpolator 48. The direction detector 42 may detect a correlation direction at an interpolation object position. The pixel selector 43 may select at least one pixel to be used for directional interpolation. The arithmetic interpolator 48 may generate an arithmetic interpolation pixel using a method other than a method of the directional interpolation. The detection of the correlation direction, the method of arithmetic interpolation, or the like in the present embodiment may be similar to those described above with reference to FIGS. 1 to 6. The pixel, selected by the pixel selector 43, may be a pixel necessary for the first directional interpolation method and a pixel necessary for the second directional interpolation method.

The image magnifying apparatus 40 may include a first directional interpolator 44 and a second directional interpolator 45. The first interpolator 44 may generate a directional interpolation pixel by the first directional interpolation method, and the second directional interpolator 45 generate a directional interpolation pixel by the second directional interpolation method.

The graphic area detector 46 may extract an area, including peripheral pixels of the interpolation object position, as a reference area. Further, the graphic area detector 46 may detect the interpolation object position as a graphic image area, when the reference area satisfies a predetermined detection condition. For example, the reference area may be an area having six pixels in the horizontal direction and six pixels in the vertical direction. The detection condition may be whether a predetermined number of pixels, among the pixels in the reference area, are equal to each other. For example, the predetermined number may be four, and the pixels being equal to each other may be determined depending on whether a difference between the pixel values of the predetermined number of pixels is within a predetermined range. In detail, when four or more same pixels exist in an area having six pixels in the horizontal direction and six pixels in the vertical direction, the interpolation object position may be detected as the graphic image area. When the reference area does not satisfy the detection condition, the interpolation object position may be detected as a natural image area. The predetermined number and the predetermined range regarding the detection condition may be arbitrarily set. In addition, various other methods may be used to detect the graphic image area.

A selector 47 selects the directional interpolation pixel or the arithmetic interpolation pixel according to the correlation direction at the interpolation object position and the correlation direction at the pixel to be used for the directional interpolation. Further, in the case of selecting the directional interpolation, the selector 47 may further select the directional interpolation pixel, according to the determination result of the graphic area detector 46. When the interpolation object position is detected as the graphic image are, the selector 47 selects the directional interpolation pixel generated by the first directional interpolator 44. In addition, when the interpolation object position is detected as the natural image area, the selector 47 selects the directional interpolation pixel generated by the second directional interpolator 45. An output interface 49 outputs the selected interpolation pixel.

As described above, in the image magnifying apparatus 40, the graphic area detector 46 may determines types of images in the interpolation object position. The image magnifying apparatus 40 may select and output the directional interpolation pixel according to the determination result. Accordingly, interpolation suitable for each of the graphic image are and the natural image area may be performed.

Figure 17:
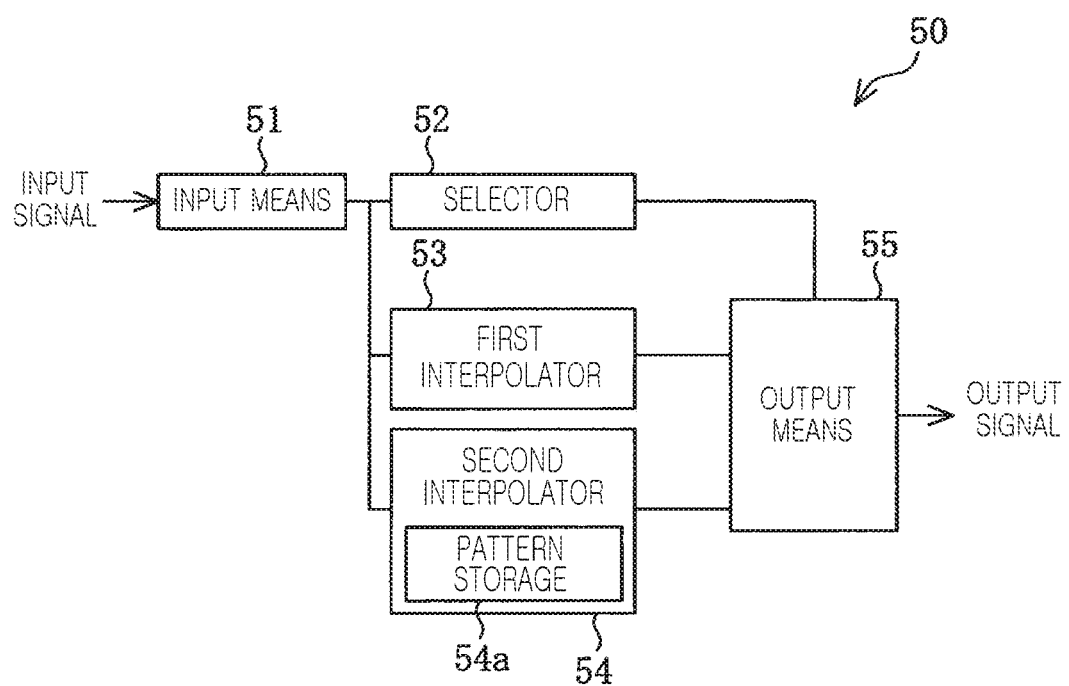
FIG. 17 is a block diagram illustrating a configuration of an image magnifying apparatus according to an embodiment.
Figure 18:
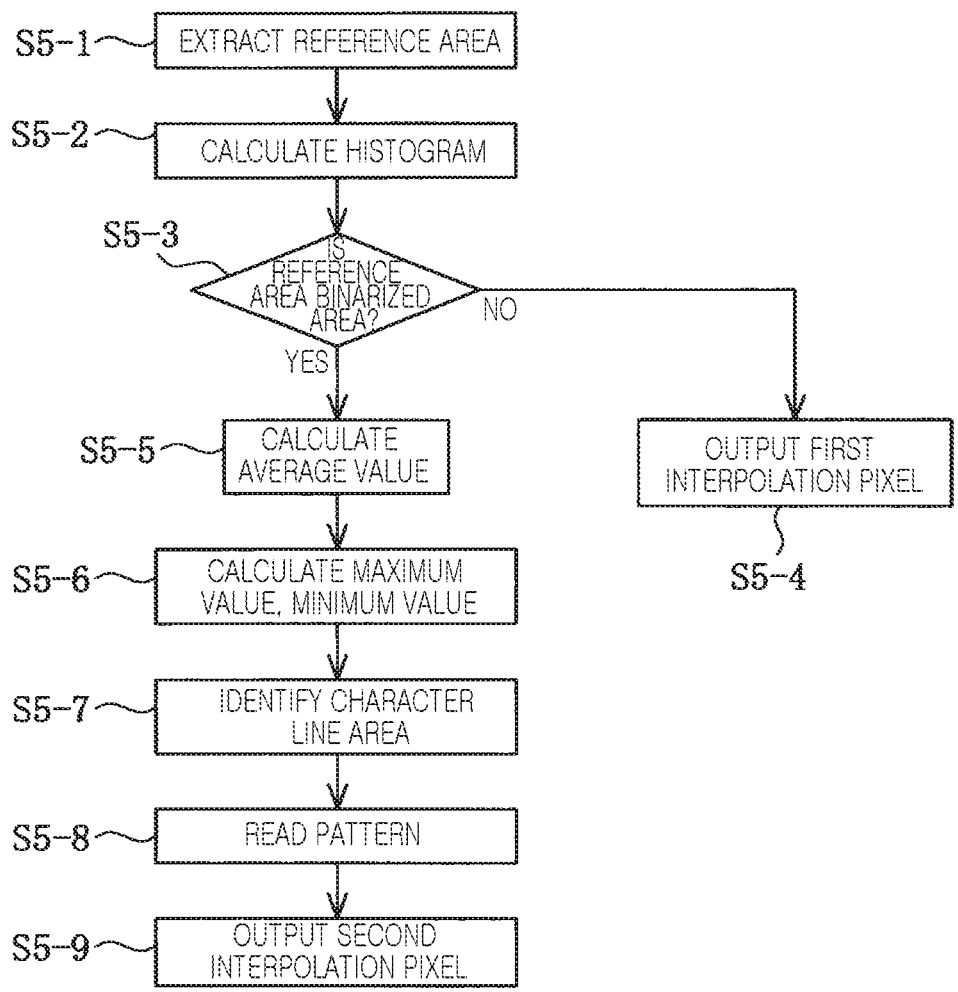
FIG. 18 is a flow chart illustrating an operating method of an image magnifying apparatus according to an embodiment.
Figure 19A:
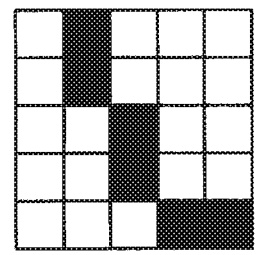
FIGS. 19A to 19C are diagrams illustrating a character line before magnification and a simply magnified character line and a character line and adapted to a pattern.
Figure 19B:
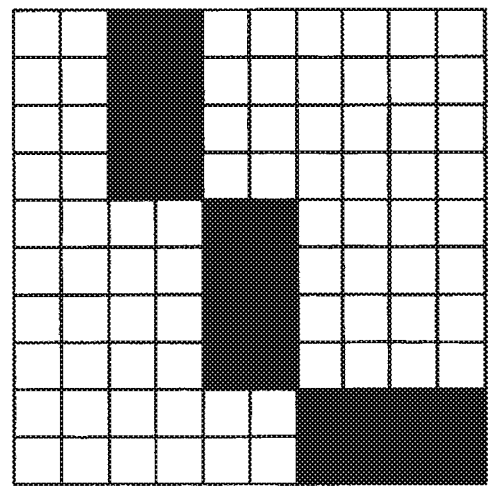
Figure 19C:
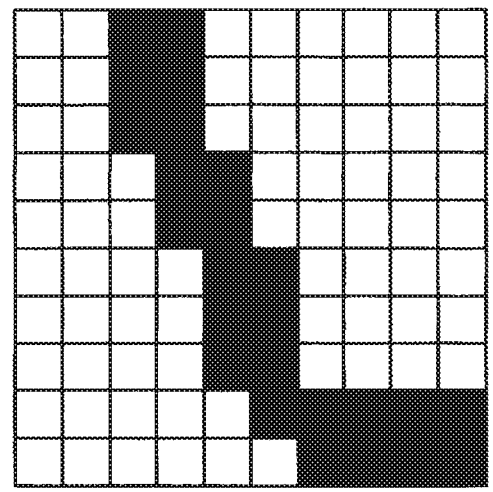

FIG. 17 is a block diagram illustrating a configuration of an image magnifying apparatus according to an embodiment. FIG. 18 is a flow chart illustrating an operating method of an image magnifying apparatus according to an embodiment, and FIGS. 19A to 19C are diagrams illustrating a character line before magnification and a character line simply adapted to a magnified character line and a pattern in an embodiment.

An image magnifying apparatus 50 illustrated in FIG. 17 may smoothly magnify character lines in an image. The image magnifying apparatus 50 may include an input interface 51 receiving an input signal. The input interface 51 may transmit an image included therein to a selector 52, a first interpolator 53, and a second interpolator 54.

The selector 52 may extract a reference area including peripheral pixels of an interpolation object position from the image and detect the reference area. A method of detecting the reference area will be described later. The first interpolator 53 may generate a first interpolation pixel for the interpolation object position by an interpolation method for a natural image. As the interpolation method for the natural image, for example, a bi-cubic method or a Lanczos method, not being limited thereto, may be used. The second interpolator 54 may generate a second interpolation pixel for the interpolation object position by an interpolation method for a character line. The interpolation method for the character line will be described later. An output interface 55 may output an interpolation pixel generated by an interpolation method selected by the selector 52.

Hereinafter, a method of generating and outputting an interpolation pixel in the present embodiment will be described with reference to FIG. 18. First, the selector 52 may extract a reference area around an interpolation object position (S5-1). For example, the reference area may be a square area including six pixels in the horizontal direction and six pixels in the vertical direction. The selector 52 may calculate a histogram for the extracted reference area (S5-2). Next, the selector 52 may determine whether the reference area is a binarized area by using the calculated histogram (S5-3). When the reference area is the binarized area, the selector 52 may select an interpolation method for a character line. On the other hand, when the reference area is not the binarized area, the selector 52 may select an interpolation method for a natural image. When the selector 52 selects this interpolation method, the output interface 55 may output a first interpolation pixel generated by the first interpolator 53 (S5-4).

The second interpolator 54 may calculate Ave, which is an average value of pixel values included in the reference area (S5-5). Next, the second interpolator 54 may calculate the maximum value Max and the minimum value Min among pixel values in the reference area (S5-6). Next, the second interpolator 54 determines which pixel is included in a character line, among pixels having a lager pixel value and pixels having a smaller pixel value (S5-7). When a detection condition of Max−Ave>Ave−Min is satisfied, the second interpolator 54 may determine a pixel having a larger pixel value in the reference area as an area of the character line. Further, when the detection condition is not satisfied, the second interpolator 54 may detect a pixel having a smaller pixel value in the reference area as the area of the character line.

The second interpolator 54 may include a pattern storage 54*a*. The pattern storage 54*a* may store a pattern of a character line in an area of a given size and a pattern of the character line which is magnified, in association with each other. For example, the area stored in the pattern storage 54*a* may include four pixels in the horizontal direction and four pixels in the vertical direction.

The second interpolator 54, in order to identify a pattern of a character line, may extract an area having four pixels in the horizontal direction and four pixels in the vertical direction from around the interpolation object position. The second interpolator 54 may read a magnified pattern matching a pattern of a character line of the extracted area from the pattern storage 54*a* (S5-8). The second interpolator 54 may generate a second interpolation pixel for the interpolation object position based on the read magnified pattern.

As illustrated in FIG. 19A, when an oblique line included in a character line before magnification, and it is simply doubly magnified, it may be shown as in FIG. 19B. In an embodiment illustrated in FIG. 19B, a step in the oblique line may be doubly magnified as it is. Therefore, the step of the character line is conspicuous and the character line may not be smooth. With respect to the oblique line, the pattern storage 54*a* may store a magnified pattern to be adapted. The pattern storage 54*a* may store each magnified pattern for the pattern of the character line which may exist in an area having four pixels in the horizontal direction and four pixels in the vertical direction.

FIG. 19C is may be a diagram illustrating a case in which the magnified pattern of the pattern storage 54*a* is adapted. By adapting the magnified pattern of the pattern storage 54*a*, the oblique line of the character line may be smoothed.

As described above, the image magnifying apparatus 50 of the present embodiment may determine whether the periphery of an interpolation object position is a character line. Further, the image magnifying apparatus 50 may determine an area of the character line, and adapt a magnified pattern stored in the pattern storage 54*a* to the pattern of the character line. Thus, the step of the character line in an image may be substantially reduced and the character line is interpolated to be a smooth line.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion At least one of the components, elements, modules or units (collectively "components" in this paragraph) represented by a block in the drawings such as FIGS. 1, 7, 9, 16 and 17 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

As set forth above, according to example embodiments of the inventive concept, by selecting an interpolation method in accordance with peripheral pixel values of an interpolation object position, noise generated by directional interpolation may be suppressed and a high quality magnified image may be obtained.

While example embodiments have been shown and described above, it will be apparent to those skilled in the art that modifications and variations could be made without departing from the scope of the inventive concept as defined by the appended claims.

What is claimed is:

1. An image magnifying apparatus comprising:
an input interface configured to receive an input signal comprising an image;
at least one processor to implement:
a direction detector configured to detect a first correlation direction from an interpolation object position to peripheral pixels of the interpolation object position in the image comprising a plurality of pixels;
a pixel selector configured to select at least one pixel to be used for interpolation based on the first correlation direction;
a directional interpolator configured to generate a directional interpolation pixel for the interpolation object position by performing directional interpolation using the selected pixel;
an arithmetic interpolator configured to generate an arithmetic interpolation pixel for the interpolation object position in a manner different from the directional interpolation; and
a selector configured to select either the directional interpolation pixel or the arithmetic interpolation pixel as an interpolation pixel for the interpolation object position according to a first detection condition; and
an output interface configured to output a magnified image comprising the selected interpolation pixel,
wherein the first detection condition is whether a difference between information about the interpolation object position and information about the selected pixel is within a predetermined range,
wherein the pixel selector is further configured to detect a second correlation direction from the selected pixel to a peripheral pixels of the selected pixel,
wherein the difference between the information about the interpolation object position and the information about the selected pixel is an angle difference between the first and second correlation directions in the image, and
wherein each of the first and second correlation directions is represented by an index value obtained by dividing a number of pixels separated in a vertical direction by a number of pixels separated in a horizontal direction, from a reference pixel to another pixel, and the predetermined range of the first detection condition is set as a range of the index value.

2. The image magnifying apparatus of claim 1, wherein, in response to determining that the angle difference is within a predetermined range, the selector selects the directional interpolation pixel as the interpolation pixel for the interpolation object position.

3. The image magnifying apparatus of claim 1, wherein, in the image, in response to determining centers of two or more pixels exist on a first line extending from the interpolation object position in the first correlation direction, the pixel selector selects two pixels closest to the interpolation object position on the first line, and the directional interpolator generates the directional interpolation pixel from the two selected pixels, and
wherein, in the image, in response to determining that there is no pixel of which a center exists on the first line, the pixel selector:
determines a second line, which is perpendicular to the first line at the interpolation object position, and third and fourth lines which are parallel and closest to the first line and on which a center of at least one pixel exists;
determines two intersection points of the second, third and fourth lines for interpolation; and
selects at least one pixel on each of the third and fourth lines for interpolating at each of the two intersection points, and
the directional interpolator:
calculates an interpolation pixel value for each of the two intersection points based on a pixel value of the selected at least one pixel; and
generates the directional interpolation pixel using the calculated interpolation pixel value.

4. The image magnifying apparatus claim 1, wherein, in the image, in response to determining that centers of two or more pixels exist on a first line extending from the interpolation object position in the first correlation direction, the pixel selector selects two pixels closest to the interpolation object position on the first line, and the directional interpolator generates the directional interpolation pixel from the two selected pixels, and
wherein, in the image, in response to determining that there is no pixel of which a center exists on the first line, the pixel selector'
determines a second line, which is perpendicular to the first line at the interpolation object position, third, fourth, fifth and sixth lines which are parallel to the first line and on which a center of at least one pixel exists, the third and fourth lines being closest to the first line;
determines two intersection points of the second, third and fourth lines for interpolation, and two intersection points of the second, fifth and sixth lines for interpolation; and
selects at least one pixel on each of the third, fourth, fifth and sixth lines for interpolating at each of the four intersection points, and the directional interpolator:
calculates an interpolation pixel value for each of the four intersection points based on a pixel value of the selected at least one pixel; and
generates the directional interpolation pixel using the calculated interpolation pixel value.

5. The image magnifying apparatus of claim 1, wherein the processor further implements a graphic area detector configured to extract a reference area comprising the interpolation object position, and determine whether the reference area satisfies a second detection condition in which a predetermined number of pixels including the reference area have a substantially same pixel value,
wherein, in response to determining that the reference area satisfies the second detection condition, the selector determines that the reference area is a graphic image area, and the directional interpolator generates the directional interpolation pixel using a first interpolation method adapted to interpolating the graphic image area, and
wherein, in response to determining that the reference area does not satisfy the second detection condition, the selector determines that the reference area is a natural image area, and the directional interpolator generates the directional interpolation pixel using a second interpolation method adapted to interpolating the natural image area.

6. The image magnifying apparatus of claim 5, wherein the directional interpolator uses the first interpolation method by calculating an interpolation pixel value for each of two points adjacent to the interpolation object position and existing on a same line intersecting a line extending from the interpolation object position in the first correlation direction in the image, and generating the directional interpolation pixel using the calculated interpolation pixel value.

7. The image magnifying apparatus of claim 5, wherein the directional interpolator uses the second interpolation method by calculating an interpolation pixel value for each of four points adjacent to the interpolation object position and existing on a same line intersecting a line extending from the interpolation object position in the first correlation direction in the image, and generating the directional interpolation pixel using the calculated interpolation pixel value.

8. The image magnifying apparatus of claim 1, wherein the selected pixel exists on a line parallel to the first correlation direction in the image.

9. The image magnifying apparatus of claim 1, wherein the first detection condition is whether a difference between a pixel value of each of the selected pixels, that is two or more pixels, and a pixel value of the arithmetic interpolation pixel is within a predetermined range.

\* \* \* \* \*